Aug. 25, 1970 — G. H. DREMANN — 3,525,840
TAKE-APART BELT FOR MICROWAVE OVEN
Filed Nov. 13, 1967 — 2 Sheets-Sheet 1

INVENTOR:
GEORGE H. DREMANN
BY
Carl C. Batz
ATT'Y

Aug. 25, 1970     G. H. DREMANN     3,525,840
TAKE-APART BELT FOR MICROWAVE OVEN
Filed Nov. 13, 1967     2 Sheets-Sheet 2

INVENTOR:
GEORGE H. DREMANN
BY
Carl C. Batz
ATT'Y

United States Patent Office 3,525,840
Patented Aug. 25, 1970

3,525,840
TAKE-APART BELT FOR MICROWAVE OVEN
George H. Dremann, Berkeley, Calif., assignor to Cryodry Corporation, San Ramon, Calif., a corporation of California
Filed Nov. 13, 1967, Ser. No. 682,211
Int. Cl. H05p 9/06, 5/00
U.S. Cl. 219—10.55
4 Claims

ABSTRACT OF THE DISCLOSURE

A microwave oven is provided with a take-apart belt having leading and trailing endes united by loops of low dielectric loss material in interlocking relation and held together by a pin of low dielectric loss material, the belt, belt joint and lacing being free of metallic parts.

SUMMARY

In prior commercial practice, take-apart belts in microwave ovens have employed a series of metal wire loops stapled to and alternately spaced along the width of either end of the belt and with a plastic pin inserted through the lops to hold belt ends together. I have found that the metal parts in the structure have adverse electrical effects and present a problem in obtaining uniform commercial results. An endless belt is impracticable because this would require that the oven be disassembled for many purposes, such as for cleaning, breakage, repair, etc., but when a take-apart belt is employed, the problem of connecting the ends without producing high electric potentials and other adverse results must be overcome.

Good results have been obtained in a microwave oven by providing a take-apart belt in the form of a flexible strip of low dielectric loss material, with the leading end and trailing end provided with a plastic tube which is notched to form loops and with the loops interlocked and joined by a plastic pin. The joint may be formed by folding a plastic strip, which is thermally stable at 250° F., upon itself and stitching the plastic strip to an end of the belt with plastic thread and then notching the tube to form loops, the loops being joined by a plastic pin. The plastic may be stitched to a glass fiber strip and the strip then secured by stitching to the belt end. If desired, the belt itself may be formed of nylon fibers calendered to unite them in a sheet, and the ends of the belt may be folded over and stitched to provide tubes at their ends, the tubes being notched to form loops and the loops joined by a plastic pin.

DRAWINGS

Figure 1:
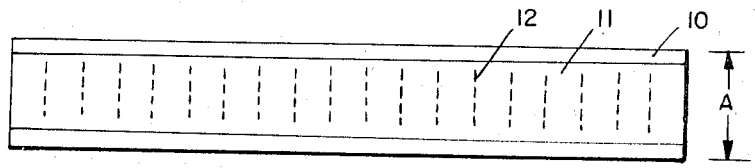
Figure 2:
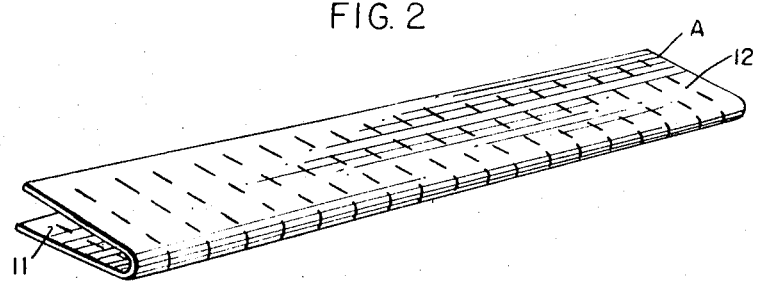
Figure 3:
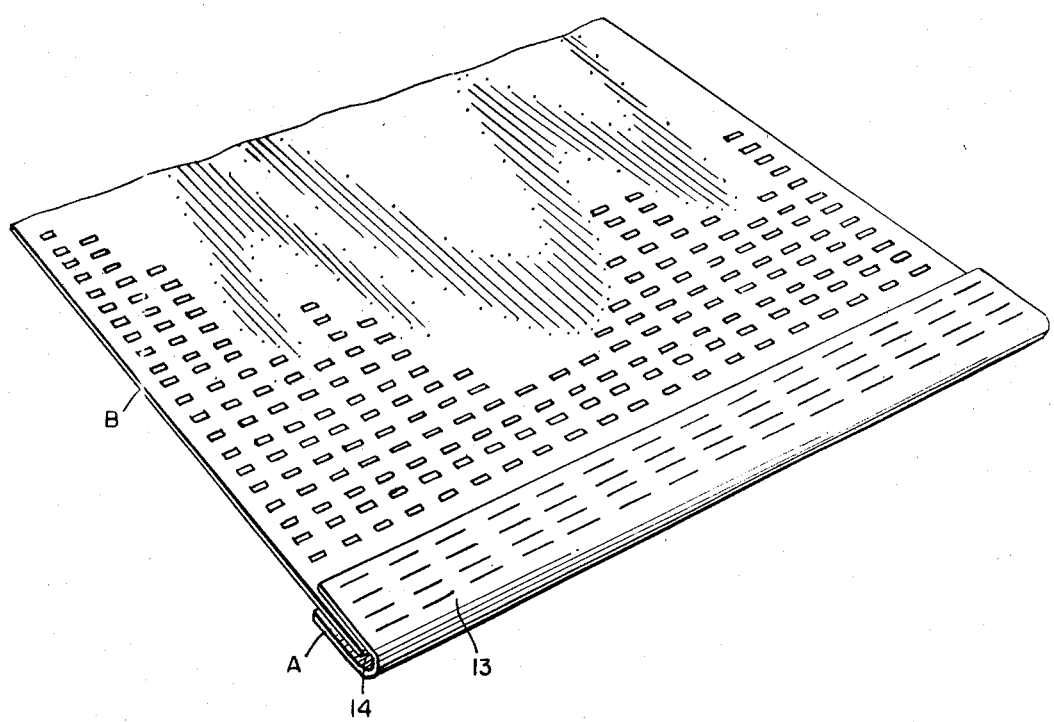
Figure 4:
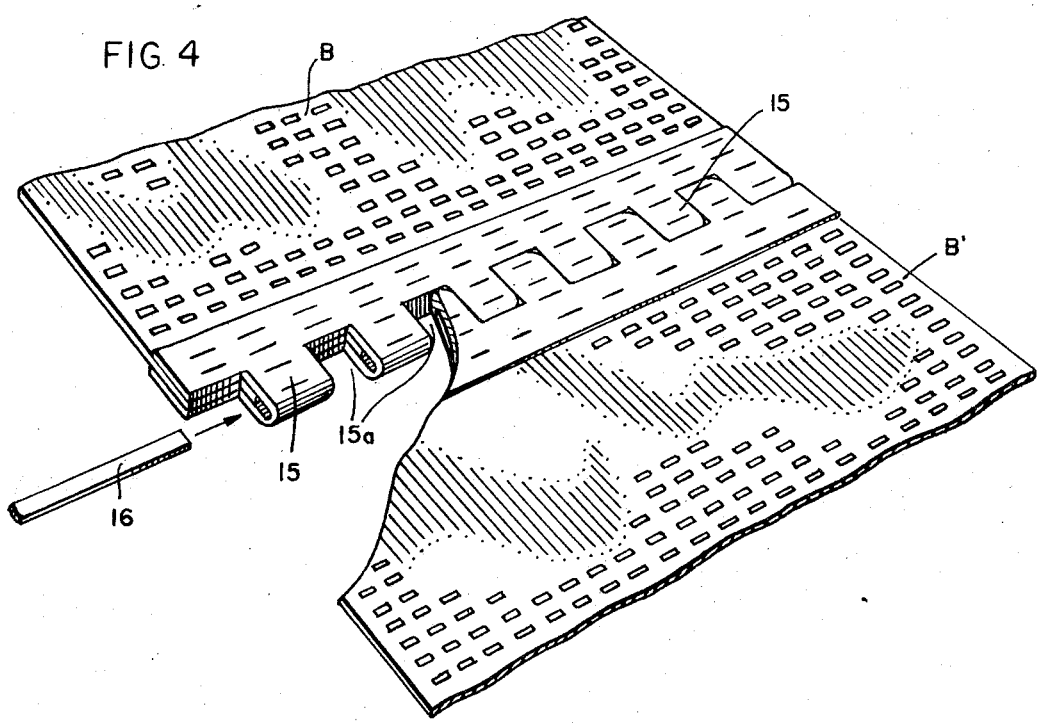
Figure 5:

In the accompanying drawings, FIG. 1 is a top plan view of a strip of glass fibers united to a plastic sheet by stitching; FIG. 2, a perspective view of the folded sheet ready for application to the end of a belt; FIG. 3, a broken perspective view showing the folded strip stitched to an end of a belt and forming a tube; FIG. 4, a view similar to FIG. 3 but showing the tube notched to form loops and the mating other end of the belt similarly formed and ready to be united by a plastic pin; FIG. 5 a broken side view in elevation of the end portion of a modified form of the invention in which the belt itself formed of low dielectric loss material has its end portion folded to form a tube, the tube being provided with notches; and FIG. 6 a perspective view of an oven equipped with the take-apart belt.

DETAILED DESCRIPTION

In the illustration given in FIGS. 1–4 inclusive, a glass cloth strip 10 is covered partially with a plastic strip 11, such as, for example, a polyester film (Mylar), and the two strips secured together by nylon stitching 12. The composite strip, which is indicated by the letter A, is folded upon itself, as shown in FIG. 2, and the folded body stitched to the end of a belt B, as shown in FIG. 3, the stitches being indicated by the numeral 13 and the being spaced from the outer edge of the strip A so as to form a tube 14. The tube 14 is then notched to form loops 15, as shown in FIG. 4, and the opposite end of the belt, which is indicated by the letter B¹, is similarly provided with loops 15a (preferably offset by one notch) so as to bring the two belt ends into interlocking engagement, as shown in FIG. 4. The belts ends are then joined by a plastic pin 16.

I prefer to form the belt joint, as described above, with a polyester film stitched by nylon thread to silicone rubber coated glass cloth, the polyester film (Mylar) being machine stitched to the glass cloth and the finished strip A folded double, as described above, and then stitched by nylon threads 13 to both ends of the belt. Alternate tabs are cut into the tube 14 to form the loops 15 and 15a, which are then brought into engaged relation, as shown in FIG. 4. A coat of self-leveling silicone rubber is preferably applied to the surfaces to seal both the stitching and the overlap of the end pieces to the belt.

In the modification shown in FIG. 5, I provide a belt C of low dielectric loss material which has each end portion folded upon itself to provide a tube 17, the folded edges being stitched together by plastic (preferably nylon) threads 18. The tube thus formed at each end of the belt is then notched, as described in connection with FIG. 4, to provide interlocking loops to be joined by the plastic pin 16. The plastic pin is preferably a flat glass reinforced epoxy resin plastic pin, but any suitable plastic pin material may be employed.

In the structure shown in FIG. 5, I prefer to employ an aromatic nylon calendered paper or sheet (Nomex) because this material may be folded upon itself and stitched and notched to provide an effective belt joint without adding a separate joint member. Further, the material is compatible with high power microwave energy and has an inherent temperature capability which far exceeds process operating temperatures. The material will not support combustion. It is unaffected by caustics or cleaning solutions, hot oil, etc. It has sufficient web stiffness to resist the buckling loads imposed by the transverse vector component of the friction force between the pulley and belt as the belt is forced against a tunnel wall, and it further resists constant flexing over the pulleys. The sheet or paper is formed of aromatic nylon fibers which are brought together and calendered under high pressure and temperature to form a composite sheet requiring no additional bonding material.

The nylon fiber calendered sheet is slightly absorbent and I prefer to coat it with an absorption-preventing film, such as polysulfone plastic coating, Teflon coating, polypropylene coating, or natural Viton, etc.

I prefer to use a moisture-free calendered nylon paper (Nomex). If the paper contains moisture, I prefer to pre-treat the paper to remove all free moisture, heating the paper slowly from room temperature to about 250° F. over a period of 60 minutes and holding at the temperature for about 120 minutes, and then allowing it to cool to approximately 100° F. I then prefer to impregnate the paper with oil by heating it to 250° F. while submerged in the oil. The foregoing treatment removes all free moisture from the calendered nylon paper fibers, and the oil impregnation prevents subsequent moisture infiltration.

Figure 6:
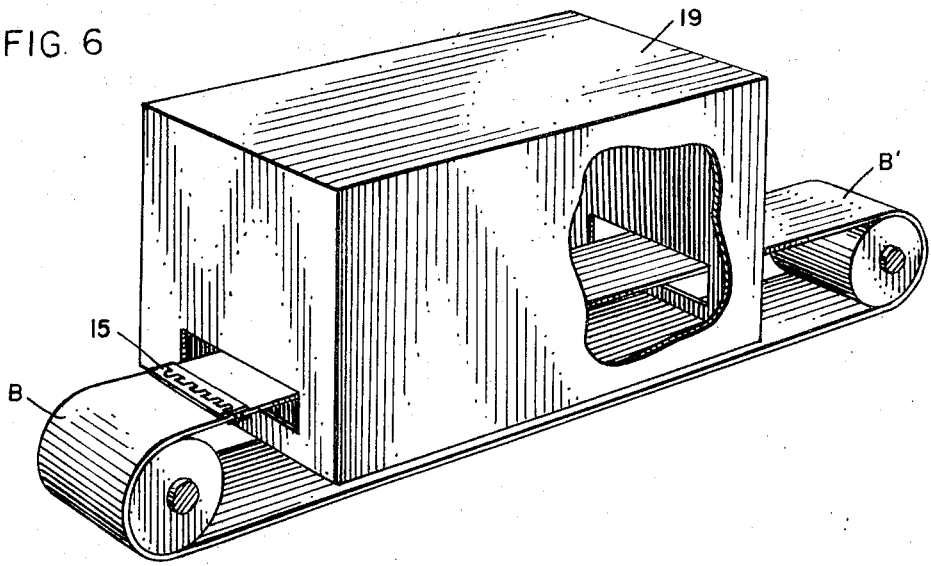

From the foregoing, it will be seen that the take-apart belt is effectively joined without any element which interferes with the flow of the microwave energy, and uniform results are obtained on materials being treated by the microwave oven. In FIG. 6, the microwave oven 19 is shown in a representative manner and in connection with the belt portions B and B¹. Since the microwave oven is well known and its construction and use well understood in the industry, a further detailed description is believed unnecessary.

While in the foregoing specification, I have set out specific structures in considerable detail for the purpose of illustrating the invention, it will be understood that such details may be varied widely by those skilled in the art without departing from the spirit of my invention.

I claim:

1. In a microwave oven having a belt extending therethrough, the belt comprising a flexible strip of low dielectric loss material and having a leading end and a trailing end adapted to be detachably connected to the leading end; the improvement comprising: detachable connecting means detachably connecting the leading and trailing ends, said detachable connecting means comprising first and second connector means fixed to the leading and trailing ends, respectively, said detachable connecting means is comprised of low dielectric loss material and further includes a pin of low dielectric loss material adapted to engage said first and second connector means to detachably connect the leading and trailing ends of the belt.

2. In a microwave oven according to claim 1 wherein said first and second connector means each include loop means arranged so that portions of said loop means on one end of the belt lie laterally between portions of said loop means on the other end of the belt, said loop means being fixed to the belt ends by stitching formed of a low dielectric loss material thread, said pin engaging all of said portions of said loop means.

3. In a microwave oven according to claim 2 wherein said loop means on each belt end are formed by a notched strip of plastic folded over an end of the belt, said strip being stitched to the belt and laterally notched to form said loop means.

4. In a microwave oven according to claim 3 wherein said strips comprise a glass fiber cloth and a polyester film stitched thereto by a low dielectric loss material thread, the belt being formed of calendered nylon fibers covered by a plastic coating.

References Cited

UNITED STATES PATENTS

| | | | |
|---|---|---|---|
| 3,017,014 | 1/1962 | Cumming | 198—193 |
| 3,256,416 | 6/1966 | Murphy | 219—10.69 |
| 3,368,933 | 2/1968 | Wicker | 198—193 X |
| 3,177,333 | 4/1965 | Lamb | 219—10.55 |
| 3,242,304 | 3/1966 | Hickman | 219—10.55 |
| 3,353,968 | 11/1967 | Krajewski | 219—10.55 |

JOSEPH V. TRUHE, Primary Examiner

L. H. BENDER, Assistant Examiner

U.S. Cl. X.R.

219—10.69